Figure 5:
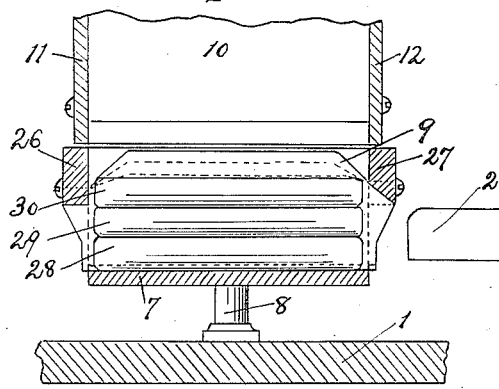
Figure 6:
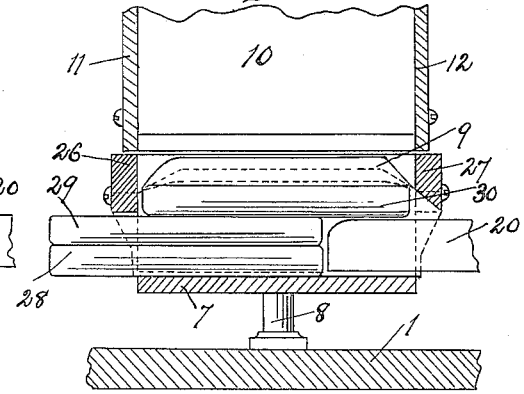
Figure 7:
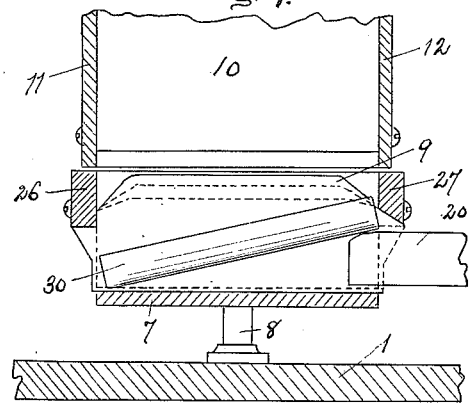
Figure 8:
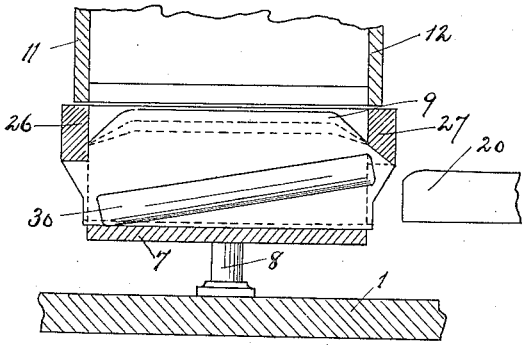

C. CHARTRAND.
WRAPPING MACHINE.
APPLICATION FILED JAN. 28, 1914.
1,163,320.
Patented Dec. 7, 1915.
9 SHEETS—SHEET 1.
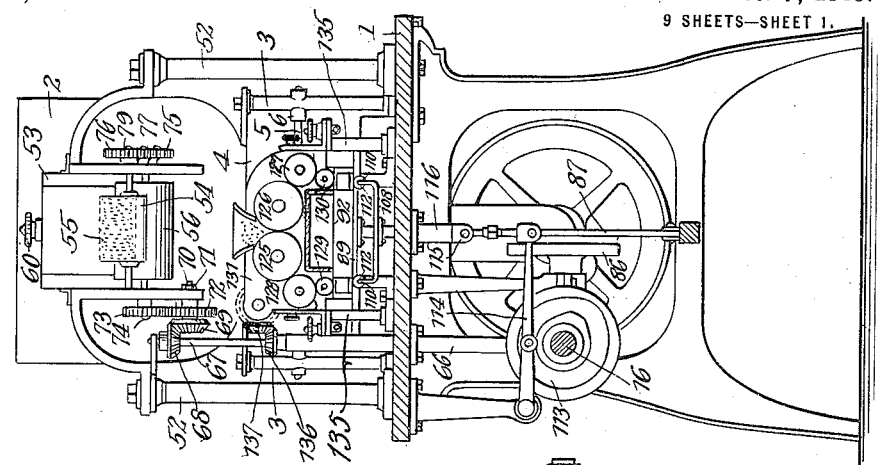
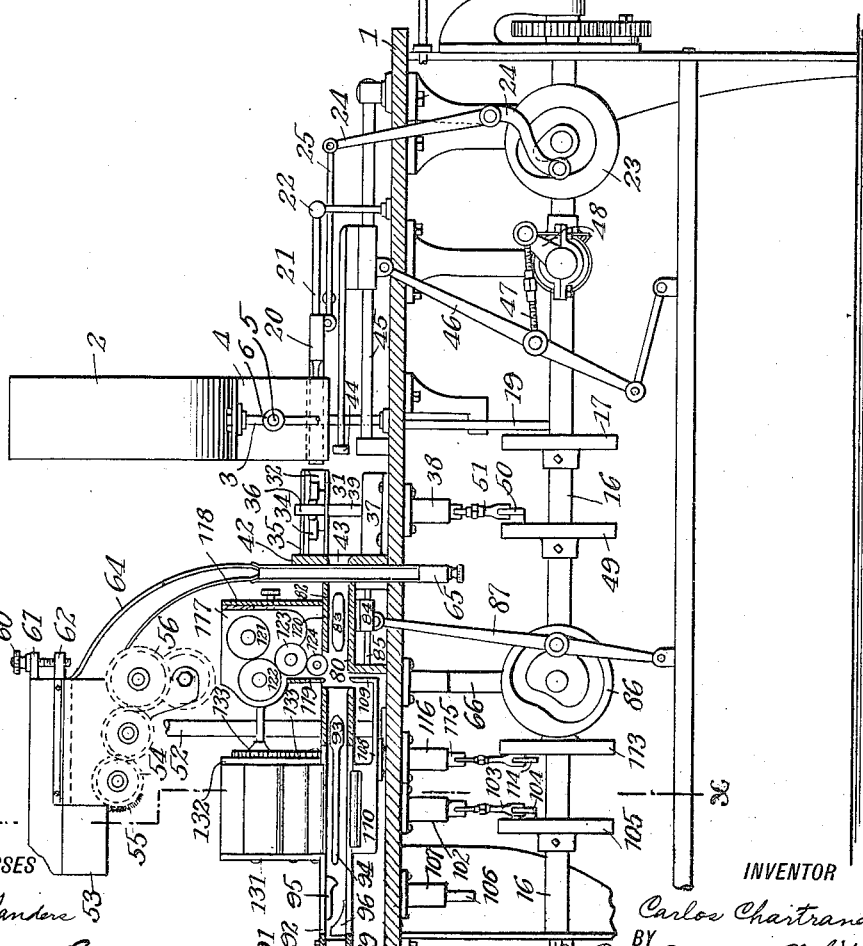
WITNESSES
John C. Sanders
Chauncey P. Carl
INVENTOR
Carlos Chartrand
BY
M. Wallace White
ATTORNEY C. CHARTRAND.
WRAPPING MACHINE.
APPLICATION FILED JAN. 28, 1914.
1,163,320.
Patented Dec. 7, 1915.
9 SHEETS—SHEET 2.
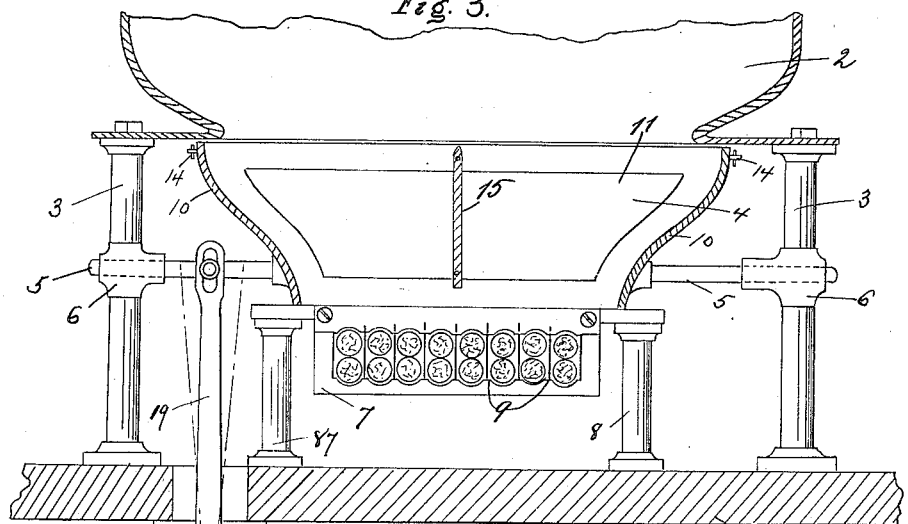
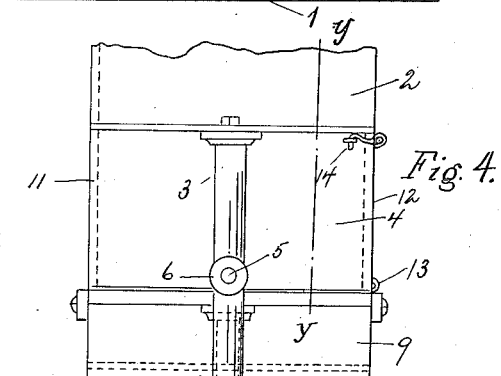
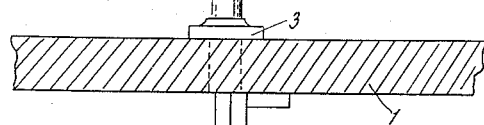
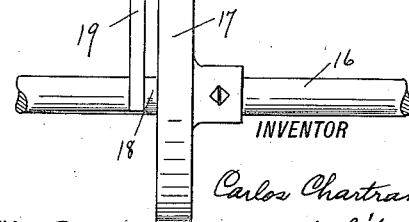
WITNESSES:
John C. Sanders
Chauncey P. Carter
INVENTOR
Carlos Chartrand
BY Wm. Wallace White
ATTORNEY

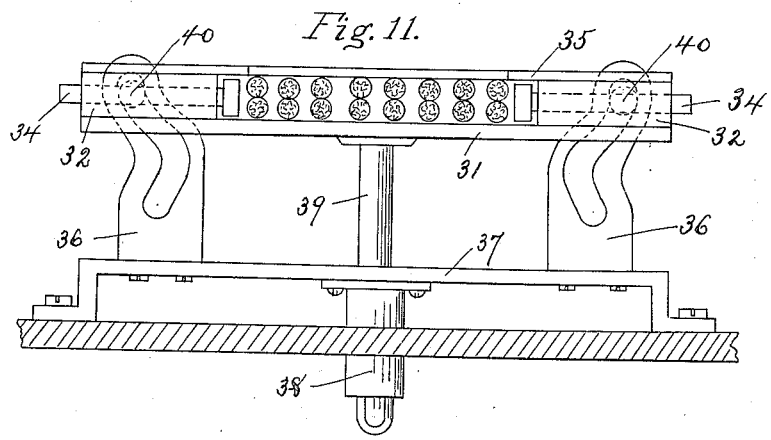
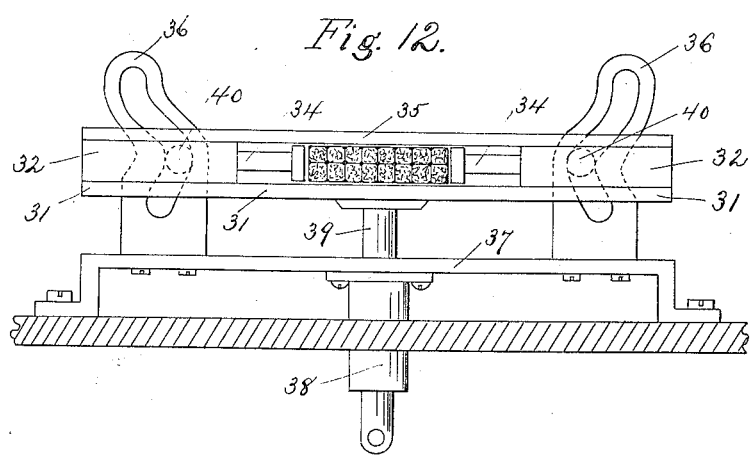

C. CHARTRAND.
WRAPPING MACHINE.
APPLICATION FILED JAN. 28, 1914.

1,163,320.

Patented Dec. 7, 1915.
9 SHEETS—SHEET 5.

WITNESSES:
John C. Sanders
Chauncey P. Carter

INVENTOR
Carlos Chartrand
BY Wm. Wallace White
ATTORNEY

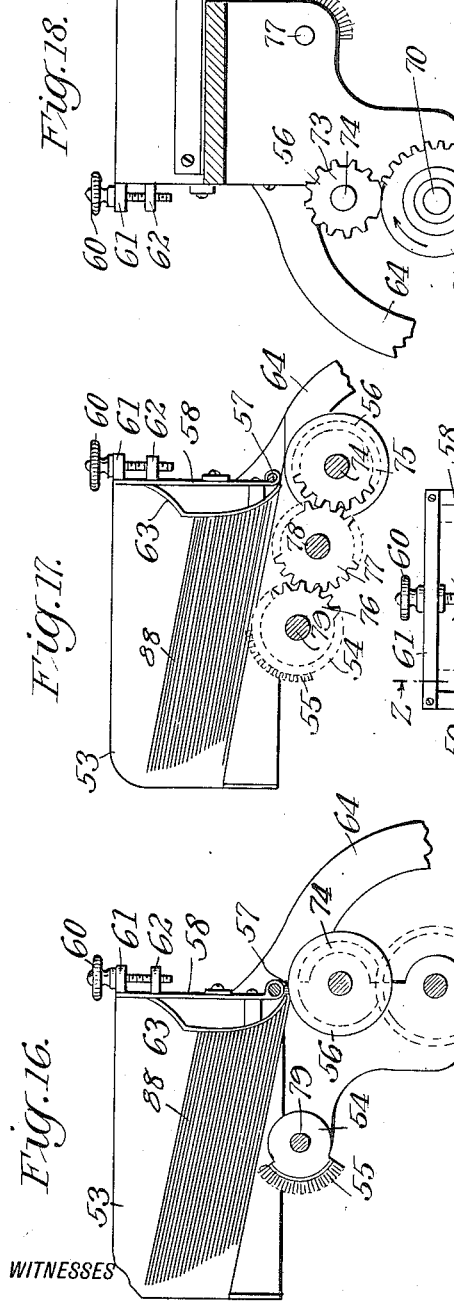

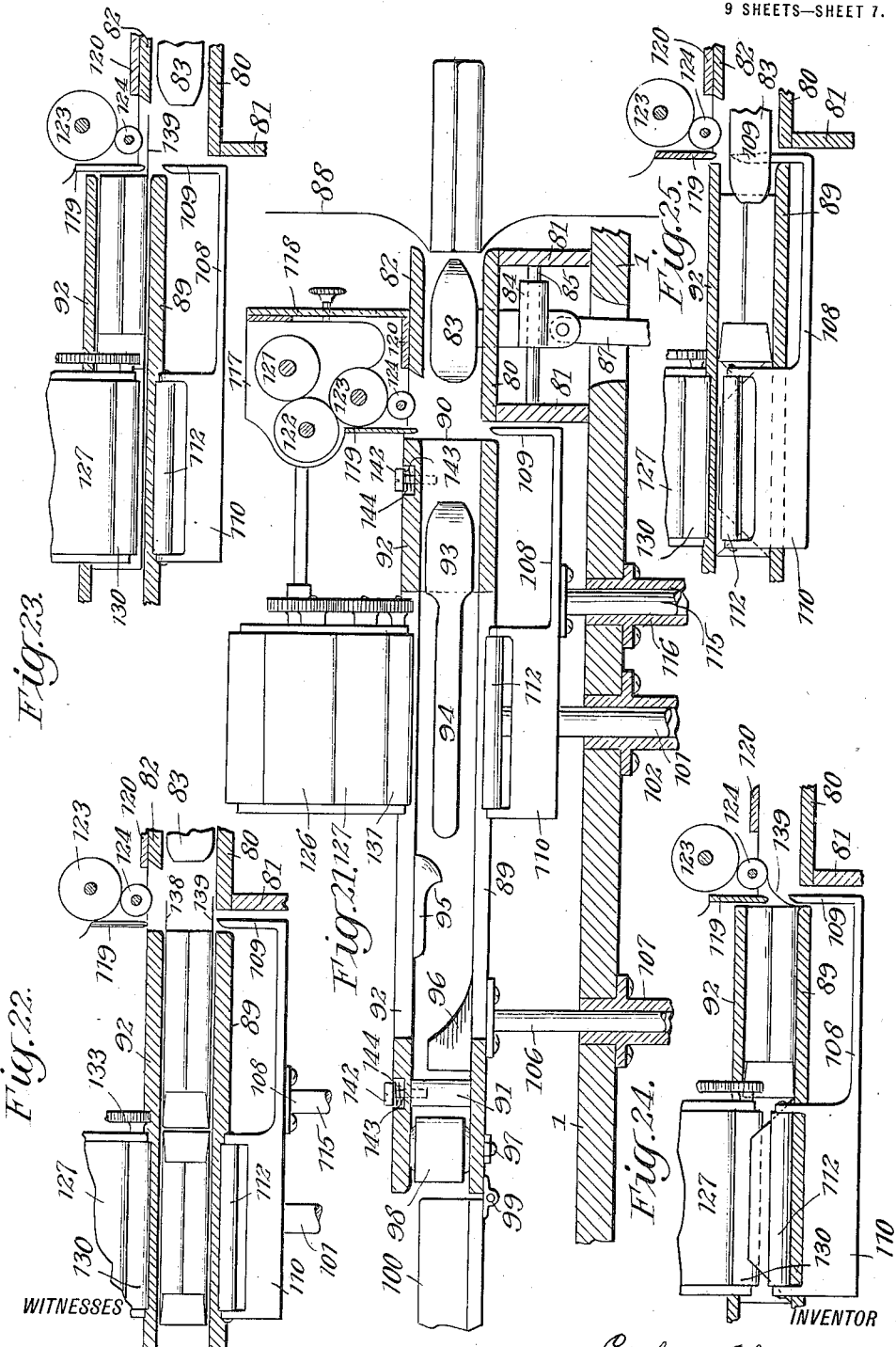

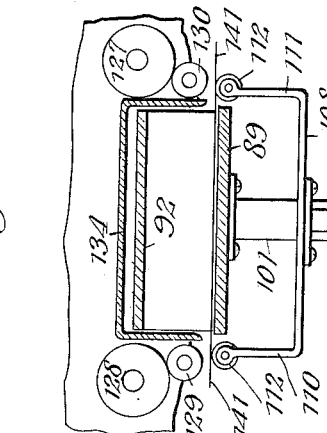
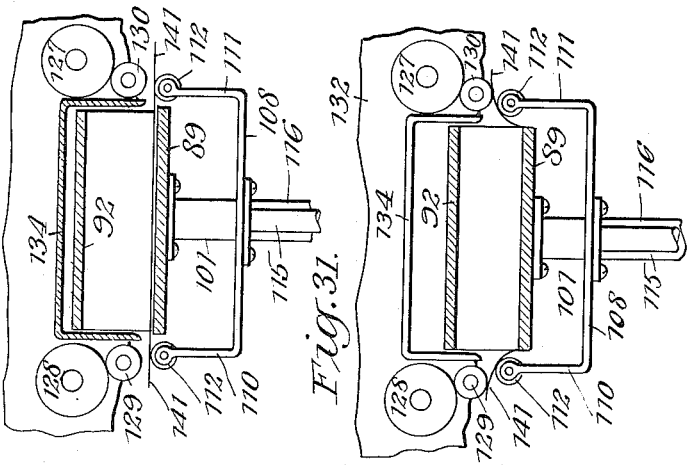
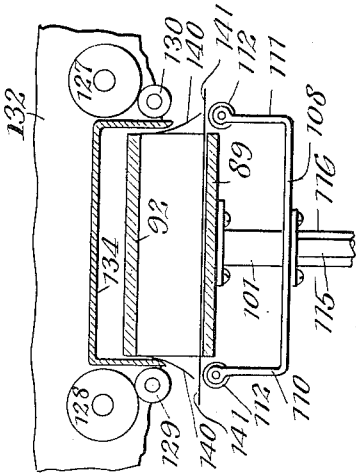
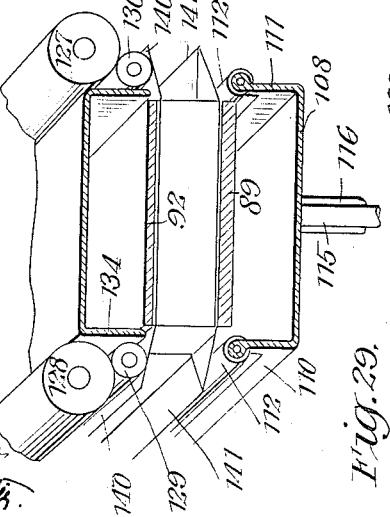

C. CHARTRAND.
WRAPPING MACHINE.
APPLICATION FILED JAN. 28, 1914.
1,163,320.
Patented Dec. 7, 1915.
9 SHEETS—SHEET 9.
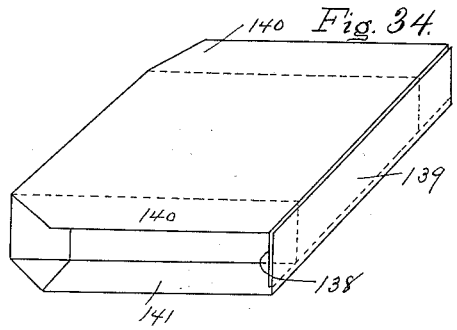
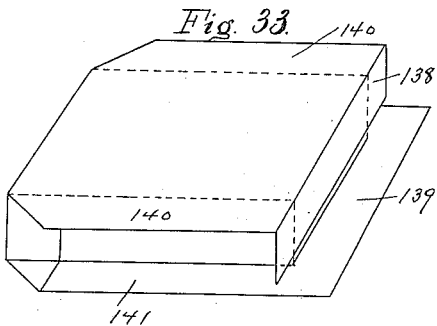
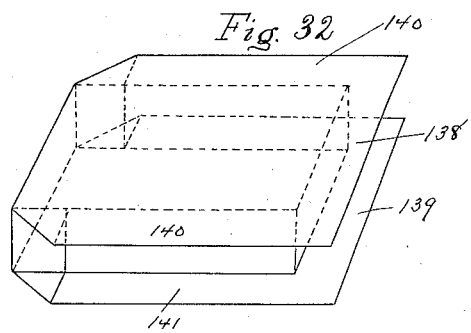
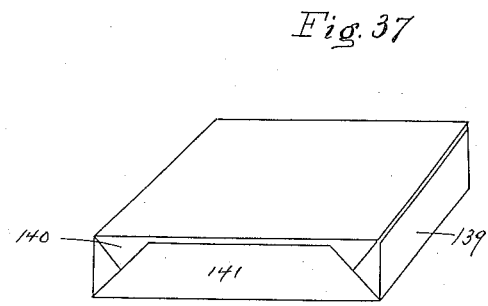
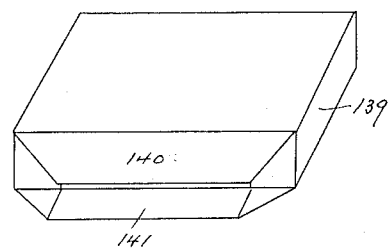
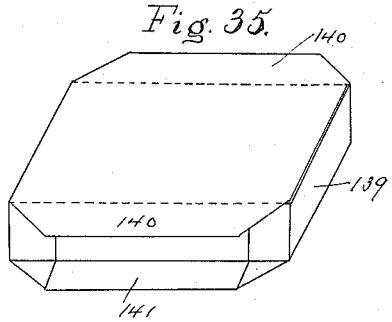
WITNESSES:
John C. Sanders
Chauncey P. Carr
INVENTOR
Carlos Chartrand
BY Wallace White
ATTORNEY

UNITED STATES PATENT OFFICE.

CARLOS CHARTRAND, OF HABANA, CUBA, ASSIGNOR TO SOCIEDAD ANÓNIMA ENCAJETILLADORA MECÁNICA, OF HABANA, CUBA.

WRAPPING-MACHINE.

1,163,320.  Specification of Letters Patent.  Patented Dec. 7, 1915.

Application filed January 28, 1914. Serial No. 814,868.

*To all whom it may concern:*

Be it known that I, CARLOS CHARTRAND, citizen of Cuba, residing at Vedado M. No. 4, Habana, in the Province of Habana and Republic of Cuba, have invented certain new and useful Improvements in Wrapping-Machines, of which the following is a specification.

This invention relates in general to machines employed to wrap small articles, such as cigarettes, and relates especially to certain new and useful improvements in the parts of such machines intended to carry out the distinctive operations necessary to separate from a bunch of cigarettes a certain number of them, to form a block or package with the cigarettes thus separated, to furnish periodically with regularity a stamp or marker for the wrapper, to surround the bunch with it and double it conveniently over it, and to furnish the adhesive matter necessary to firmly close the package after being wrapped. Both operations have been carried out up to the present in an imperfect manner, on account of the defective conception of said parts of machines, and by the complication of their mechanism, producing a tardy result and great waste of cigarettes and marks or wrappers, with the loss, delay and trouble consequent upon defective work.

The present improvements have been invented to overcome said difficulties, by employing for the purpose mechanical, simple and durable methods, easy to construct and operate and of efficient working.

Another object of this invention is to provide adequate means to graduate the machine so that it may be adapted to the wrapping of cigarettes of various lengths, without varying any of the different parts of the machine.

Another object of the invention is to obtain the automatic graduation of the corresponding parts, in order that it may be possible to wrap cigarettes of more or less thickness.

With these and other objects which will be shown later, the necessary parts are provided and means to operate them which comprise the new and original details of construction and combination of parts, which are described in the present specification, are shown in the accompanying drawings, and are specified in the claims.

Each one of said parts has essential features which distinguish them substantially from those which have been employed up to the present time, as will be seen from the following description made with relation and with reference to the figures of the accompanying drawings, in which are designated the same parts by the same characters.

Figure 9:
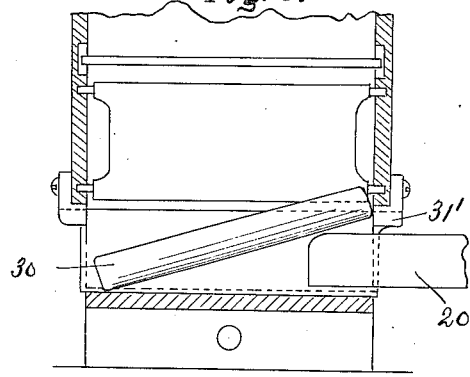
Figure 10:
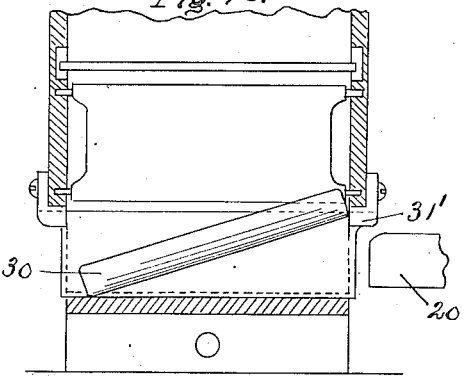

Figure 1, is a lateral view of the machine in part sectionally divided longitudinally through the center. Fig. 2, is a front view of the machine, according to a transverse section taken on the line X—X of Fig. 1. Fig. 3, shows the counting apparatus, register or enumerator, or separator of cigarettes seen in front and in part sectionally divided by the line Y—Y of Fig. 4. Fig. 4, shows the register or enumerator apparatus seen from one of its sides. Figs. 5, 6, 7, and 8, are views of inner details of said register, showing how the cigarettes are contained therein, the manner in which they are taken out and the method provided to expedite the fall of new cigarettes after each extraction. Figs. 9, and 10, are graphic illustrations of an enumerator or register, such as has been used up to the present, in which the difference is shown between the method used for the delivery of the cigarettes in it, and the dispositive which is employed in the improved register which is described. Figs. 11, 12, 13, and 14, represent the different positions of the mechanism which receives the cigarettes from the register, to form a bunch or adequate package to be wrapped. Fig. 15, is a front view of the marker stamp or die to form the wrapper and the means to operate it. Fig. 16, is a section of the marker stamp or die on the line Z—Z of Fig. 15, showing its position when the apparatus is still. Fig. 17, is a similar view, when the marker stamp or die is in operation. Fig. 18, is a lateral view of the marker stamp, on line Z'—Z' of Fig. 15, showing the means employed to move it intermittently. Figs. 19, and 20, are details of the said marker stamp, and of the means employed to withdraw from the same a single mark or wrapper at each operation and to prevent the outlet of the rest. Fig. 21, shows a section on a larger scale of the folding and gumming mechanism shown also in section, Fig. 1. The Figs. 22, 23, 24, and 25, are details of said mechanism on a larger scale and in different positions of the same to effect the folding and to furnish adhesive matter to the paper. Fig. 26, shows in perspective part of the doubling or folding and gumming mechanism of the sides. Figs. 27, 28, 29, 30 and 31, are details of said mechanism in different phases of its operation, and Figs. 32, 33, 34, 35, 36, and 37 represent perspective views of the different phases of the package during the process of its formation.

The whole of the referred to parts and mechanism is mounted upon a table 1, showing at 2, the upper section of the register, or enumerator which constitutes a deposit for the cigarettes supported by the standards 3, fixed onto the table. This deposit is fixed and directly under it is the intermediate section constituted by a funnel or hopper 4, movable longitudinally upon the running or sliding bars 5, fixed in the sides of the funnel, and which operates in the journals 6, upon the columns 3. Below the intermediate section is a lower fixed section 7, supported on the columns 8, also fixed to the table 1, said lower section being divided into compartments or cells by vertical partitions 9, the height of the divisions at the center being greater than the height of the divisions at the sides, or said divisions or partitions being arranged substantially in echelon.

The intermediate section constituted by the hopper 4, or funnel, moves between the upper and lower sections and consists of two lateral inclined walls 10, which are set in the form of an inverted cyma, a back wall 11, fixed to the sides 10, and another front wall 12, articulated by a hinge 13, so that it can be displaced from its normal closing position, to be easily handled inside, and is then maintained in said closing position by bolts 14, on the sides 10. Fixed to the back wall 11, and projecting toward the inside of the hopper is a vertical partition or division 15, which divides the intermediate section into two compartments. The reciprocal movement of the intermediate section is intended to strike the cigarettes to hasten their fall into the cells or compartments of the lower section 7, of the register, and takes place upon the slides 5, on the bearings 6, being transmitted from the main shaft 16 of the machine by means of a cam 17, which operates on a small roller 18, on one end of a lever 19, articulated at the other end to one of the sliding bars 5.

The cigarettes being placed in the register, and the machine in operation, they are withdrawn from the cells of the lower section 7, by means of a block 20, provided with grooves that divide it longitudinally forming a comb, provided with an alternative or reciprocal motion upon the guides 21, fixed by one end in the lower section of the register, and by the other to the supports 22, fixed on the table 1, the movement being transmitted to said comb by the cam 23, lever 24, and connecting bar 25. The divisions of the lower stationary section 7, rest upon the bridges 26 and 27, placed toward the upper end of said section 7. The bridge 26, is of a rectangular section, but the bridge 27, is of a section in the shape of a trapezoid, and this construction is made thus in order to make sure of the descent of the cigarettes into the cells, as will be explained and as will be clearly seen by the comparison between a bridge of a section like a trapezoid and another of a rectangular section, represented respectively in the figures which are indicated herein. When the comb 20, penetrates into the cells, it pushes forward the last two cigarettes 28 and 29, and places itself under the third cigarette 30, Figs. 5 and 6, which rests upon it in a horizontal position; but when the comb effects its outward movement the cigarette loses its horizontal position and inclines forward as shown in Figs. 7, 8, 9, and 10, and has at the same time a tendency to let itself be drawn or pulled by the brushing against the comb, its outgo being prevented by the bridge. If this were constructed as heretofore, according as is shown at 31', Figs. 9 and 10, the head of the cigarette would remain in touch with the inner vertical plane of said bridge, 31, which maintains it in an inclined position as is shown, preventing it from falling to the bottom of the cell in spite of the movements of the intermediate section, occasioning what is technically called a fault or slip of the register. In order to avoid this, is the design of the trapezoid construction of the bridge 27 because the cigarette being drawn by the comb 20, strikes its head against the inclined plane of the same and falls easily to the bottom of the cell, upon the complete withdrawal of the comb 20, as is clearly shown in Figs. 7 and 8. This is an essential feature of the register which distinguishes it from others known up to the present time.

The cigarettes withdrawn from the register by the comb 20, in the manner already explained, are introduced into the part of the machine intended to form them into a bunch or package, which hereinafter will be called a box, a compressing box or case, constituted by the bottom plane 31, at whose ends the heel pieces 32 project, provided with the small boxes 33, which serve as guides for the sliding pressure plates 34, of the cigarettes.

Upon both heel pieces a plate 35 is screwed which forms the top or lid of the box and which at the same time completes the guide formed by the small boxes 33, and said top as well as the heel pieces and the bottom plate 31, are grooved longitudinally to give room or way to the pieces 36, grooved curvilineally and which project vertically upward firmly fixed in a plate 37, which in turn is fixed or secured to the table 1, and which serve as the base or support of the pressure box. In the plate 37, is a fixed hollow guide support 38, through which the rod or bar 39, slides smoothly joined at one end to the bottom plate 31. The pressure slides 34, are also grooved longitudinally and by their grooves likewise traverse the vertical pieces 36, presenting therein small rollers 40, rotating on their axes 41, secured to the compressors 34 which operate in the curved grooves of the pieces 36.

Figure 13:
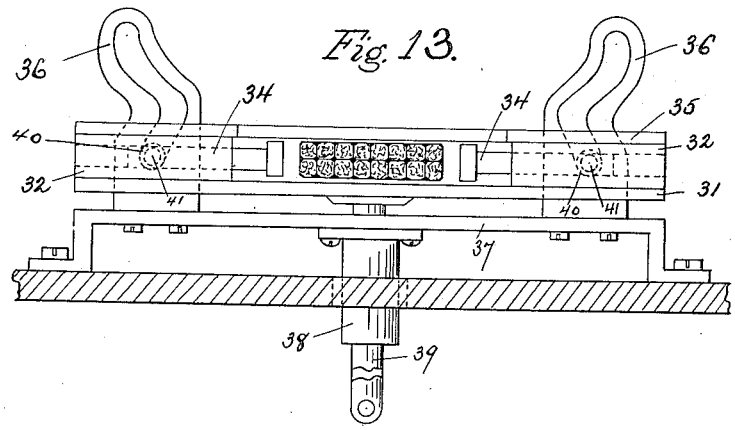
Figure 14:
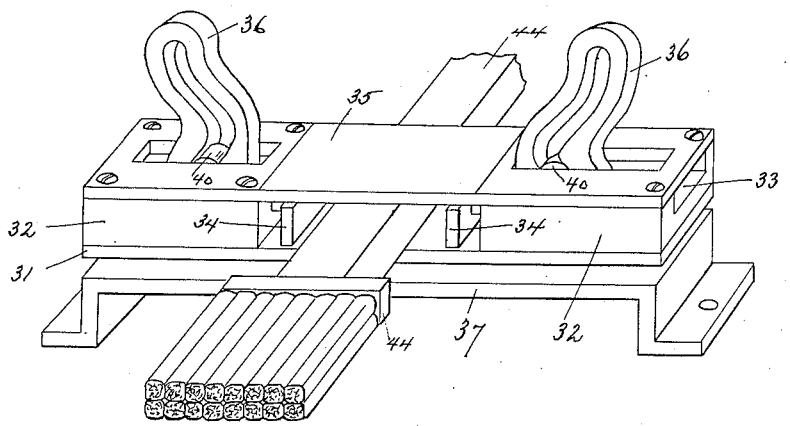

The pressure box has an upward and downward movement during which the rollers 40, operate in the grooves of the pieces 36, and compel the sliding compressors to approach or separate one from the other, Figs. 11, 12, and 13, according to the place that the rollers 40, occupy in their respective grooves. When the box ascends it places itself in the same plane as the lower section 7 of the register, and the rollers 40, are then found in the upper part of the curves of the pieces 36, bringing the runners 34 to their most separated position to receive the cigarettes which are withdrawn from the register by the comb 20, Fig. 11: when the box descends carrying with it the cigarettes, the rollers or runners 40, pass by the most salient parts of the curves referred to, and the maximum approach of the pressure slides 34, which press the cigarettes as is seen in Fig. 12 is accomplished, the descent of the box continuing, the runners or rollers 40 then operate in the lower part of the curves of the pieces 36, the sliding rollers 34, then separating a little as is seen in Fig. 13 to diminish the pressure upon the cigarettes and thus allow the bunch to be taken out easily from the box in the manner to be hereinafter described. This construction is thus made, in order that the compressors shall form a package of a thickness suitable to be easily admitted by the folding device, the pressure on the cigarettes being much greater than the dimensions of said device due to the fact that the cigarettes never leave the machine which manufactures them of the same diameter, some being thicker than others, for that reason it being necessary to have an excess of pressure, likewise on account of the tendency of the package of cigarettes to spread and to expand after being pressed, above all in damp weather, which makes its course more difficult upon passing through the folding mechanism.

As the machines do not make cigarettes of the same uniform diameter, neither do they make them of the same lengths, varying therein sometimes as much as three millimeters, and it is necessary to even up the package of cigarettes by their heads, in order to obtain a perfect wrapper. This is obtained by the following manner. Secured to the plate 37 and projecting vertically upward is a partition, 42, Fig. 1, against which are pushed the cigarettes upon being introduced into the box by the comb 20, and the ends of the latter press against the division, the heads of the longer cigarettes, thus equalizing the package.

The division, or partition, 42, is provided with a rectangular opening 43, of beveled borders placed in the same plane as an injecting member or rammer 44, which pushes and extracts the cigarettes from the box when this descends and the pressure of the compressors upon the package has diminished, to take them to the folding device, said injector member 44, being operated upon the runners 45, from the main shaft 16 of the machine by the lever 46, the connecting rod 47 and the crank or handle 48, the latter having geared connection to the shaft 16 as shown in Fig. 1. Finally the ascending and descending movements of the pressure box are transmitted from the main shaft 16 of the machine, by the cam wheel 49, the lever 50, connection 51 and bar or rod 39, which runs through the support of the hollow guide 38. While these operations are being effected, a marker stamp or die, has been furnished by the corresponding device which will hereinafter be called a marker. This is supported on the standards 52 secured to the table 1, and consists of a deposit or receptacle 53, to contain the markers placed one on the other. The bottom of the deposit forms an inclined plane and presents a groove or channel in its central portion through which traverses and penetrates into the deposit a small roller 54, provided with a brush of steel fibers, or bristles, or wire burnisher on part of its periphery 55, to push and withdraw periodically, the last marker from beneath the package or bunch, making it pass over a rubber cylinder located at the end of the inclined bottom and against which another brush or burnisher instrument 57, brushes, and which extends along the said cylinder in accordance with its generator, secured to the lower end of a plate 58, placed toward the front of the receptacle or deposit 53, and which can be adjusted vertically or which goes up or down in order to suitably graduate the contact between the cylinder 56 and the burnisher 57, and leave a greater or smaller space between both for the passage of the marker; said upward and downward movements of the sliding or slipping of the plate 58 on the runners 59, is produced by the operation of the hand screw 60, rotating on the bridge 61, and which winds itself in the heel 62, secured on the plate 58. Joined to this plate and toward its upper end is a plate 63, which projects toward the interior of the deposit or receptacle 53, and the package of markers rests upon this plate. The lower end of this plate 63, terminates in the same plane as the ends of the brush or burnisher 57, and presents a curved surface so that the markers resting upon it may adopt the same form, thus the lower ones are found to be ahead or in advance of the upper ones, to make their withdrawal easier.

The channel 64, which is prolonged across the table by an opening made therein, is directly opposite the line of contact between the cylinder 56 and burnisher 57, and the markers which are withdrawn from the deposit slide along said channel, until they rest vertically on the tops 65, suitably disposed under the channel 64.

The cylinders 54 and 56 are given a rotary movement either intermittent or periodical, which is obtained by means of the following mechanism. Under table 1, is secured a hollow guide support 66, through which passes a rod 67, provided at its lower end with a corner pinion which engages with another similar pinion secured to the shaft of the machine, (not shown,). In the upper end of the rod 67, is another pinion 68, which connects with the pinion 69, which revolves freely on a short shaft 70, suitably secured to the frame of the marker by the screw 71. Also fixed to the short shaft 70 for rotation or movement simultaneously with the pinion 69, is a gear wheel 72 which is in the form of a mutilated gear having the greater portion of its peripheral edge toothed and the remaining portion thereof smooth and with its arc in the same circle concentric to the inner ends of the teeth, that is, in the first circle or tangent of an arc which is the prolongation of the circle of the wheel proper. This wheel operates another similar wheel 73, secured on the shaft 74, but whose smooth portion is cut by an arc described with the same radius center as that of the primitive circle of the wheel 72, so that said smooth portion of the wheel 73 affects a concave form into whose concavity penetrates the convexity of the smooth portion of the wheel 72. The rubber cylinder 56, is also secured to the shaft 74, and at the other end of the shaft, is found the toothed wheel 75 fixed thereto, which transmits its movement to the toothed wheel 76 by the intermediary 77, which rotates freely upon a short shaft 78. The wheel 76 is secured to a shaft 79, to which is also secured the cylinder 54 provided with wire brush 55.

Upon rotating the pinion operated by the rod 67, the pinion 69 and the cog wheel 72 will also rotate, while the smooth convex surface of the same is passing along the concavity of the wheel 73, this remains idle and fixed, but begins to revolve when the teeth of the wheel 72 engage with those of the wheel 73, drawing along in its movement all the rest of the gearing hereinbefore described and consequently the cylinders 56 and 54. In this rotary movement the brush or burnisher 55 comes into contact with the last marker below the package and pushes it forward compelling it to pass through the space between the brush 55 and the cylinder 56. The marker which is found directly over the one which is pushed forward and withdrawn, has also a tendency to allow itself to be pulled forward and withdrawn, but is stopped by the sharp ends of the wire brush 57. The marker which is withdrawn falls by its own weight slipping over the channel 64 and remains in a vertical position by the tops 65 on the lower part of the table and under the channel. In this position, upon advancing the injector or rammer 44, pushing the bunch of cigarettes forward, the forward head of this one pushes in turn the marker through the center, introducing it into the box intended to accomplish the first bends or folds of the marker on the bunch or package of cigarettes. This box consists of a lower plate 80, Fig. 21, suitably supported by the standards 81, and another upper plate 82, which forms the top or lid of the box. Inside move longitudinally and on each side, two dies, of which in Fig. 1, only one is shown, designated with the number 83, supported by the slide 84, which operates on the rods 85 fixed on the standards 81, and which receive their motion from the main shaft 16, by the cam wheel 86 and lever 87. Upon the introduction of the marker 88, into this box, it bends or doubles part over the cigarettes above and part over the cigarettes below the package, Fig. 21, and in the forward movement of the same, the dies 83, which remained idle and immovable at the entrance of the box, double or fold over the corners so that when the package or bunch is passed through the box, the marker remains folded as shown in Fig. 32, in which disposition it is introduced by the continuous forward movement of the injector or rammer 44 in the folding devices of the sides and head of the package, constituted by a lower plate 89, upon which are raised the heel pieces 90 and 91 which support the top or lid of the box or case. Upon said pieces are firmly secured the dies 93, provided with two prolongations 94 somewhat narrowed, and on the plates 89 and 92, are found respectively those pieces 95 and 96, cut with an inclination on their ends and placed in an inverted position one from the other, in order that the bent or inclined side of the first one may be turned downward and that of the second one upward.

Upon a short shaft 97 secured vertically to the plate 89, the cylinders 98 revolve freely, and at the end of said plate is a hinge 99, articulated to the discharge channel 100 of the finished small boxes.

On the lower plate, secured to the bottom of the same, is the rod 101, which traverses the hollow guide support 102, and which presents its other end suitably joined by the link 103, to the lever 104, operated by a cam wheel 105, which is firmly secured to the main shaft 16 of the machine, by which means is imparted to the folding box already described, an upward and a downward movement, providing it further, for the purpose of preventing lateral movements of said box, a guiding rod 106, fixed to the bottom of the same, and which glides along a hollow guiding support 107, secured firmly to the bottom of the table 1, in a suitable and adequate manner. This box, in combination with the gummers, as will be explained further on, carries out the first foldings of the marker on the head and sides of the bunch or package, and in order to carry out the second and last foldings, a plate 108 is provided upon which are raised the squares 109, 110 and 111, the first being constituted by a plate with the upper edge beveled, and the second present their edges provided with two small cylinders of small diameter 112, which revolve freely on their shafts. These folders, as does the box, carry out an upward and a downward movement, transmitted from the shaft 16 of the machine by a cam wheel 113, which moves the lever 114, articulated at the end to the rod 115 which runs across the hollow guiding support 116, and which is suitably secured to the lower face of the plate 108.

The gummers, as has already been said, coöperate with the mechanism already described, for the formation of the folds of the sides and the head of the package, at the same time that they furnish the gum necessary for its closure, and in order that the combined action of said parts be better understood, the constitution of said folder gummers will be first described. The head one, is represented in section by the Figs. 1 and 21, is constituted by a square deposit or receptacle uncovered through its upper part and formed by lateral or side plates 117, the forward front one, 118, the rear one 119, and the bottom one 120, suitably united among each other are mounted on bearings on the sides 117, the cylinders 121, 122, 123 and 124 and the bottom plate 120 being cut in such a way that it does not touch the cylinder 124, a groove being left between such plate and the one 119, through which a part of the cylinder 124 projects outside of the deposit or receptacle. All these cylinders are provided with toothed wheels secured to their shafts (not represented in the drawings) and which engage with the others to impart to them a uniform and continuous rotatory movement. This gummer is placed over the box which carries out the first foldings of the marker, stamp sheet, upon the package.

The gummer of the sides, essentially constituted in a manner similar to the former one, comprises a deposit or receptacle for the adhesive matter, or gum, and a set of cylinders 125, 126, 127, 128, 129, and 130, also mounted in a similar manner upon bearings in the side walls 131 and 132 of the deposit, provided with toothed wheels 133, which engage with each other to give a rotatory movement to said cylinders. The bottom of this deposit or receptacle, is in part formed by a bent square plate 134, and the whole of the gummer is suitably supported transversally on the machine by the standards 135, secured to the table 1. Both gummers receive their movement from the rod 67, through the angular pinions 136, and 137, and the cog wheels before referred to, suitably disposed for said purpose. The combined operations of the folding mechanisms, and of the gummers are carried out as follows: When the injector or rammer 44, recedes after having introduced the package into the folding box, this goes upward and carries with it the first package with its wings outspread. The upper wing 138 of the head, Fig. 23, is bent downward by the rear plate 119, of the gummer of the head Fig. 23, and the lower wing 139 approaches the gumming cylinder 124, leaving the box as it is represented in Fig. 33. Simultaneously with the upper movement or ascent of the folding plate 108 and the vertical square 109 upon said plate is also fixed close to the lower face of the wing 139, Fig. 23, remaining there immovable while the box carries out its descent, and in this movement of the box, the wing 139 folds itself as is seen in Fig. 24, against the square 109, lapping the periphery of the gumming cylinder 124, and sticking it on the wing 138, and the box is left as is shown in Fig. 34. When the descent of the box terminates, the dies 83 advance Fig. 25, and fold the corners of the package which then adopts the disposition which is shown in Fig. 35, the plate 108 and the square 109 descending at this moment to leave uncovered the entrance to the box in order that the second or next package be admitted, which advances pushed by the injector or rammer 44, the first package being thrust more into the box by the pushing of the second. Upon the withdrawal of the injector 44, it again carries out the series of movements of the box, already described, the head of the second package making the folds in the same manner as has been described respecting the first, and the side folds are carried out of the first package, now thrust farther into the box, as follows:—The upper side wings 140, are doubled downward in the upward movement of the box, Fig. 27, by the square folds of the plate 134 or bottom of the side gummer, and the lower ones 141, are placed near the cylinders, the gumming cylinders 129 and 130 Fig. 28, the package remaining as seen in Fig. 36; upon the descent of the box, the lower wings 141, are folded upward against the cylinders 112, lapping the gumming cylinders 129 and 130, and adhering to the wings 140, Fig. 29, and thus the formation of the package is finished in the manner represented in Fig. 37. With the successive packages the same operation is carried out, and the finished package ejected by the folding box by the advance of the following packages gliding through the discharge channel 100.

It sometimes happens that the gum or adhesive substance employed has not sufficient consistency to keep the two wings of the marker, or stamp sheet, adhered together and one is separated from the other before the finished package is ejected from the box, it being necessary to mount them again one on the other, and for that purpose the heel pieces 95, and 96, are provided in the top and bottom of the box, cut with one end inclined and opposite one to the other, as has been described. Upon the package being pushed by the following one, the heel piece 95, again folds the upper wing 140 downward and the heel piece 96 folds the lower wing 141 upward upon that, keeping it thus until the package is introduced or made to pass between the vertical cylinders 98, which exercise upon the sides of the package an adequate pressure to unite firmly the two wings together, smoothing at the same time the sides of the package, that in this manner leaves the machine with the edges completely formed.

If the feeding machine of markers, or stamp sheets, for any reason whatsoever should not withdraw the required marker or paper sheet to form the package, the cigarettes which constitute it are introduced without it into the folding boxes described, without breaking up the package because the tops and bottoms of the same and the folding dies 83 and 93 hold up the cigarettes and prevent them from falling; but upon the package advancing farther and being placed outside of the action of said dies, or be it, in the place which belongs to the second package within the folding box for the sides, there they run the risk of their falling and breaking up the package, and in order to prevent this the narrowed prolongations are provided 94, which hold up the cigarettes of the bunch preventing them from falling, and in this way they are ejected from the machine without being injured and are again utilized for the wrapper.

Although the compressing box provides the means for forming with the cigarettes a package adapted to be introduced easily into the folding devices, as has been already described, it may happen, under certain circumstances, as for instance in damp weather, that the cigarettes swell and have a greater tendency to expand after being compressed, increasing their volume so that the entrance of the package into the folding boxes or devices is rendered difficult, it being necessary to prevent this to increase the inside action of the same automatically and in accord with the size of the package.

For this purpose, the top or lid of the box is secured to the heel pieces 90 and 91, by screws 142, curled firmly around said heel pieces, but their heads may slide along in an adequate opening 143, made in the top of the box and resting upon the bottom of said opening the end of a helicoidal spring 144, the other end of which rests against the lower face of the screw head. The elastic force of said spring tends to keep the plate 92, held fast against the heel pieces 90 and 91, but when the package of cigarettes which it is about to wrap or enfold, is of greater thickness than the section of the box, it pushes the top 92, upward, overcoming in effect the tension of the spring 144, and, in this way automatically adjusting the interior section of the box in accordance with the size of the package.

Having described the invention and the manner of its operation, what is desired to protect by Letters Patent, is the following:

1. In machines for wrapping cigarettes, a separator, or register of the cigarettes, which comprises an upper section which is stationary, an intermediate section which is movable, and another lower stationary section provided with a rear bridge of a rectangular section, and another in front of a trapezoidal section, divisions or partitions resting upon said bridges and at the bottom of the section, disposed parallel, vertical and transversally, formed substantially in echelon with the height of the divisions at the center greater than the height of the divisions at the sides graduated from the center to the sides and dividing said section into a plurality of cells, substantially as has been described.

2. In machines to wrap cigarettes, a separator or register of cigarettes, which comprises an upper section and another lower section and an intermediate and movable section in the form of an inverted cyma, between these a vertically projecting partition in the form of a plate projecting into the interior of said intermediate section which divides it into two compartments, said lower section having a beveled portion to insure dropping the cigarettes, substantially as described.

3. In a wrapping machine for cigarettes, a separator or register of cigarettes which comprises an upper fixed section, another lower fixed section divided into compartments, by a plurality of vertical parallel partitions, said lower fixed section having an undercut portion preventing the retention of the cigarettes at the ends thereof and an intermediate section divided into two compartments by a vertical partition terminating at the top and bottom thereof, said intermediate movable section between the fixed sections being movable to beat or shake the cigarettes contained in the register, and make their descent easier, to fall into the cells of the lower fixed section, and means to impart movement to said intermediate section, substantially as described.

4. In machines to wrap cigarettes, a mechanism to press or squeeze the cigarettes and form with them a bunch or package of adequate dimensions to be wrapped, which comprises the combination of a box provided with an upward and downward movement with compressing members for the cigarettes, movable longitudinally in said box to compress and release the cigarettes, means to equalize the packages by the heads, means to impart to the box the ascending and descending movement and means to operate the compressing members; substantially as has been described.

5. In machines for wrapping cigarettes, a mechanism to compress or squeeze the cigarettes and form with them a bunch or package of adequate dimensions to be wrapped, said mechanism comprising the combination of a box provided with an upward and downward movement, compressing members for the cigarettes, vertically grooved members carried by the base of the mechanism and engaging said members for separating the same in the ascending movement of the box, to permit the entry of the cigarettes thereinto and approaching each other in the descent to compress said cigarettes, means to equalize the packages by the ends, means to impart to the box the ascending and descending movement and means to operate the compressing members.

6. In machines for wrapping cigarettes, a mechanism to carry out the following or subsequent folding of the wrapper upon the bunch or package of cigarettes, which comprises a box provided with an ascending and descending movement, constituted by an upper plate and another bottom plate; fixed members on the sides of the box with a narrowed prolongation to serve as a guide and keep the packages laterally, a member secured to the upper plate, with the end cut in an inclined downward plane; a similar member in the bottom plate with an upward inclination, cylinders between the upper and bottom plates, which revolve freely upon their shafts; means to impart to the box the ascending and descending movement; a gumming mechanism, a folding member to fold downward the upper wing of the wrapper upon the head of the package, constituted by a fixed plate in the fore part of the gumming mechanism; folding members which bend downward the upper wings of the wrapper on the sides, upon the package, constituted by a square bent plate secured to the bottom of a gumming mechanism; folding members to double upward the lower wings of the wrapper upon the sides and head of the package, constituted by a plate provided with an ascending and descending movement, and disposed horizontally under the folding box; a plate projecting squarely upward on the head of said horizontal plate; two side plates similarly disposed in the sides of said horizontal plate, cylinders which revolve freely on their shafts in the borders of the plates and square of the sides, and means to impart the ascending and descending movement to the members which bend upward the lower wings of the wrapper; substantially as has already been described.

7. In a machine for wrapping cigarettes, a mechanism to carry out the following or subsequent folding of the wrapper upon the front of a package of cigarettes, which comprises a box, means to impart vertical reciprocating movement to the box, means fixed at the sides of the box to prevent lateral expansion of the cigarettes, a gumming mechanism, a folding member to fold downward the upper wing of the wrapper upon the head of the package, folding members to bend downward the upper wings of the wrapper on the sides of the package, folding members to double upward the lower wings of the wrapper upon the sides and head of the package, a plate projecting squarely upward upon the head of said horizontal plate, side plates similarly disposed in the sides of said horizontal plate, and means to impart vertically reciprocating movements to the members which bend upward the lower wings of the wrappers.

In testimony whereof I affix my signature in presence of two witnesses.

CARLOS CHARTRAND.

Witnesses:
RAOUL F. WASHINGTON,
A. ROGERS.